(12) United States Patent
Kim et al.

(10) Patent No.: US 9,958,033 B1
(45) Date of Patent: May 1, 2018

(54) PLANETARY GEAR TRAIN OF AUTOMATIC TRANSMISSION FOR VEHICLES

(71) Applicants: HYUNDAI MOTOR COMPANY, Seoul (KR); KIA MOTORS CORPORATION, Seoul (KR)

(72) Inventors: Jin Ho Kim, Suwon-si (KR); Dong Hwan Hwang, Seoul (KR); Jong Sool Park, Hwaseong-si (KR); Jong Soo Kim, Seoul (KR); Kyeong Hun Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days. days.

(21) Appl. No.: 15/712,914

(22) Filed: Sep. 22, 2017

(30) Foreign Application Priority Data

May 10, 2017 (KR) .......................... 10-2017-0058301

(51) Int. Cl.
*F16H 3/62* (2006.01)

(52) U.S. Cl.
CPC ....... *F16H 3/62* (2013.01); *F16H 2200/0069* (2013.01); *F16H 2200/2015* (2013.01); *F16H 2200/2046* (2013.01)

(58) Field of Classification Search
CPC ............... F16H 3/62; F16H 2200/0069; F16H 2200/2046; F16H 2200/2015
See application file for complete search history.

(56) References Cited

U.S. PATENT DOCUMENTS

| 9,394,975 | B1* | 7/2016 | Calvert | B60K 6/365 |
| 2007/0099741 | A1* | 5/2007 | Klemen | F16H 3/66 475/280 |
| 2014/0038765 | A1* | 2/2014 | Koch | F16H 3/66 475/276 |
| 2014/0038766 | A1* | 2/2014 | Koch | F16H 3/66 475/276 |
| 2015/0011353 | A1* | 1/2015 | Otake | F16H 3/66 475/275 |
| 2015/0018159 | A1* | 1/2015 | Otake | F16H 3/66 475/275 |
| 2016/0109006 | A1* | 4/2016 | Schoolcraft | F16H 15/52 475/185 |
| 2017/0004991 | A1* | 1/2017 | Yamamoto | C09J 7/00 |

* cited by examiner

*Primary Examiner* — David J Hlavka
(74) *Attorney, Agent, or Firm* — Brinks Gilson & Lione (57) ABSTRACT

A planetary gear train of an automatic transmission for a vehicle provides at least ten forward speeds and one reverse speed by operating rotational elements of five planetary gear sets by controlling three clutches and three brakes. The planetary gear train further includes input and output shafts, and nine shafts. In particular, two shafts selected from the nine shafts are selectively connected to a transmission housing via the corresponding brakes, and also respectively connected to a corresponding rotation element of third and fourth planetary gear sets that is unconnected to another rotational element selected from the rotational elements of the five planetary gear sets.

20 Claims, 3 Drawing Sheets

| Shift-stage | Friction element | | | | | | Gear ratio | Step ratio | Remark |
|---|---|---|---|---|---|---|---|---|---|
| | C1 | C2 | C3 | B1 | B2 | B3 | | | |
| D1 | | | ● | | ● | | 4.862 | - | |
| D2 | | | ● | ● | | ● | 3.343 | 1.454 | |
| D3 | | | | ● | ● | ● | 2.48 | 1.348 | |
| D4 | ● | | | ● | ● | | 1.939 | 1.279 | |
| D5 | ● | | | | ● | ● | 1.611 | 1.204 | Gear ratio span : 9.6 |
| D6 | ● | | ● | | | ● | 1.235 | 1.304 | |
| D7 | ● | ● | ● | | | | 1 | 1.235 | Ratio of REV vs D1 :0.84 |
| D8 | ● | | ● | | ● | | 0.818 | 1.222 | |
| D9 | | ● | ● | | ● | | 0.632 | 1.294 | |
| D10 | ● | ● | | | ● | | 0.506 | 1.249 | |
| REV | | | ● | | ● | ● | -4.081 | - | |

PLANETARY GEAR TRAIN OF AUTOMATIC TRANSMISSION FOR VEHICLES

CROSS-REFERENCE TO RELATED APPLICATION

This application claims priority to and the benefit of Korean Patent Application No. 10-2017-0058301, filed on May 10, 2017, which is incorporated herein by reference in its entirety.

FIELD

The present disclosure relates to a planetary gear train of an automatic transmission for a vehicle so as to improve power delivery performance and fuel efficiency.

BACKGROUND

The statements in this section merely provide background information related to the present disclosure and may not constitute prior art.

Research to provide more shift-stages of an automatic transmission has been conducted to achieve enhancement of fuel consumption and better drivability, and recently, enhancing fuel efficiency of a vehicle draws more attention due to increase of oil price.

In this sense, research on an engine has been undertaken to achieve weight reduction and to enhance fuel consumption by so-called downsizing, and research on an automatic transmission has been performed as well to provide better drivability and fuel consumption by achieving more shift stages.

In order to achieve more shift stages for an automatic transmission, the number of parts is typically increased, which may negatively affect installability, production cost, weight and/or power flow efficiency.

As an effort to increase fuel efficiency of an automatic transmission by more shift stages with reduced number of parts, an eight-speed automatic transmission has been recently introduced, and a planetary gear train for an automatic transmission enabling more shift stages has been developed.

In this regard, disposing planetary gear sets in parallel or employing dog clutches instead of wet-type control elements is sometimes attempted. However, such an arrangement may not be widely applicable, and using dog clutches may easily deteriorate shift-feel.

We have discovered that gear ratio spans of recently developed eight-speed automatic transmissions are typically between 6.5 and 7.5, and fuel consumption enhancement is limited.

In addition, we also discovered that when a gear ratio span of an eight-speed automatic transmission rises a level above 9.0, it is difficult to maintain step ratios between adjacent shift stages to be linear, by which driving efficiency of an engine and drivability of a vehicle is undermined.

SUMMARY

The present disclosure provides a planetary gear train of an automatic transmission for a vehicle including five planetary gear sets and six friction elements so as to realize at least forward tenth speeds and at least one reverse speed, and a friction drag loss of clutches and brakes is reduced thereby improving the power transmission efficiency and the fuel efficiency.

In addition, torque transmission efficiency and durability may be improved by applying a torque parallel structure to an output side planetary gear set to reduce the torque sharing between each planetary gear set and each friction element.

Further, applying five planetary gear sets for realizing at least forward tenth speeds and at least one reverse speed increases flexibility of a gear ratio and linearity of shift stage step ratios.

In one form of the present disclosure, a planetary gear train includes: an input shaft configured to receive an engine torque; an output shaft configured to output changed torque; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh and twelfth rotation elements; a fifth planetary gear set including thirteenth, fourteenth, and fifteenth rotation elements; a first shaft connected with the third rotation element and the input shaft; a second shaft connected with the fourteenth rotation element and the output shaft; a third shaft connected with the fifth rotation element and the thirteenth rotation element; a fourth shaft connected with the second rotation element, the eighth rotation element, and the fifteenth rotation element; a fifth shaft connected with the first rotation element and the fourth rotation element; a sixth shaft connected with the sixth rotation element and the eleventh rotation element; a seventh shaft connected with the ninth rotation element; an eighth shaft connected with the seventh rotation element and the tenth rotation element; and a ninth shaft connected with the twelfth rotation element.

In one form, the planetary gear train further include six friction elements disposed to selectively connect the corresponding shafts with each other or selectively connect a corresponding shaft with a transmission housing, and wherein three friction elements among the six friction elements may be operated at forward or reverse speed stages.

The six friction elements may include three clutches connecting two shafts among the nine shafts to each other; and three brakes selectively connecting the corresponding shaft to the transmission housing, and the corresponding shaft is not connected to the input shaft or the output shaft.

The six friction elements may include: a first clutch arranged between the second shaft and the fifth shaft; a second clutch arranged between the fifth shaft and the seventh shaft; a third clutch arranged between the sixth shaft and the seventh shaft; a first brake arranged between the third shaft and the transmission housing; a second brake arranged between the eighth shaft and the transmission housing; and a third brake arranged between the ninth shaft and the transmission housing.

The first, second, and third rotational elements of the first planetary gear set are respectively a first sun gear, a first planet carrier, and a first ring gear of the first planetary gear set. The fourth, fifth, and sixth rotational elements of the second planetary gear set are respectively a second sun gear, a second planet carrier, and a second ring gear of the second planetary gear set. The seventh, eighth, and ninth rotational elements of the third planetary gear set are respectively a third sun gear, a third planet carrier, and a third ring gear of the third planetary gear set. The tenth, eleventh, and twelfth rotational elements of the fourth planetary gear set are respectively a fourth sun gear, a fourth planet carrier, and a fourth ring gear of the fourth planetary gear set. The thirteenth, fourteenth, fifteenth rotational elements of the fifth planetary gear set are respectively a fifth sun gear, a fifth planet carrier, and a fifth ring gear of the fifth planetary gear set.

The first, second, third, fourth, and fifth planetary gear sets may be disposed in a sequence of the first, third, fourth, second, and fifth planetary gear sets from an engine side. In another form, the first, second, third, fourth, and fifth planetary gear sets may be disposed in a sequence of the first, second, third, fourth, and fifth planetary gear sets from an engine side.

A planetary gear train according to an exemplary form of the present disclosure may realize at least forward tenth speeds and at least one reverse speed formed by operating the five planetary gear sets as simple planetary gear sets by controlling six friction elements.

In addition, a planetary gear train according to an exemplary form of the present disclosure may realize a gear ratio span of more than 9.6, thereby increasing efficiency of driving an engine.

In addition, the linearity of step ratios of shift stages is secured while multi-staging the shift stage with high efficiency, securing linearity of step ratios of shift stages, thereby making it possible to improve drivability such as acceleration before and after a shift, an engine speed rhythmic sense, and the like.

In addition, since application of the friction elements is reduced, the drag loss of the clutch and brake decreased, thereby improving power transmission efficiency and fuel economy.

In addition, torque transmission efficiency and durability is improved by applying a torque parallel structure to an output side planetary gear set to reduce the torque sharing between each planetary gear set and each friction element.

In addition, a planetary gear train according to an exemplary form of the present disclosure may increase the flexibility of the output gear ratio by applying five planetary gear sets.

Further, effects that can be obtained or expected from exemplary forms of the present disclosure are directly or suggestively described in the following detailed description. That is, various effects expected from exemplary forms of the present disclosure will be described in the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. As those skilled in the art would realize, the described forms may be modified in various different ways, all without departing from the spirit or scope of the present disclosure.

In the following description, dividing names of components into first, second, and the like is to divide the names because the names of the components are the same as each other and an order thereof is not particularly limited.

Further, as used herein, description of elements being "fixedly" connected or interconnected includes elements that are directly connected, i.e. one element directly connected to another element for rotation therewith.

Figure 1:
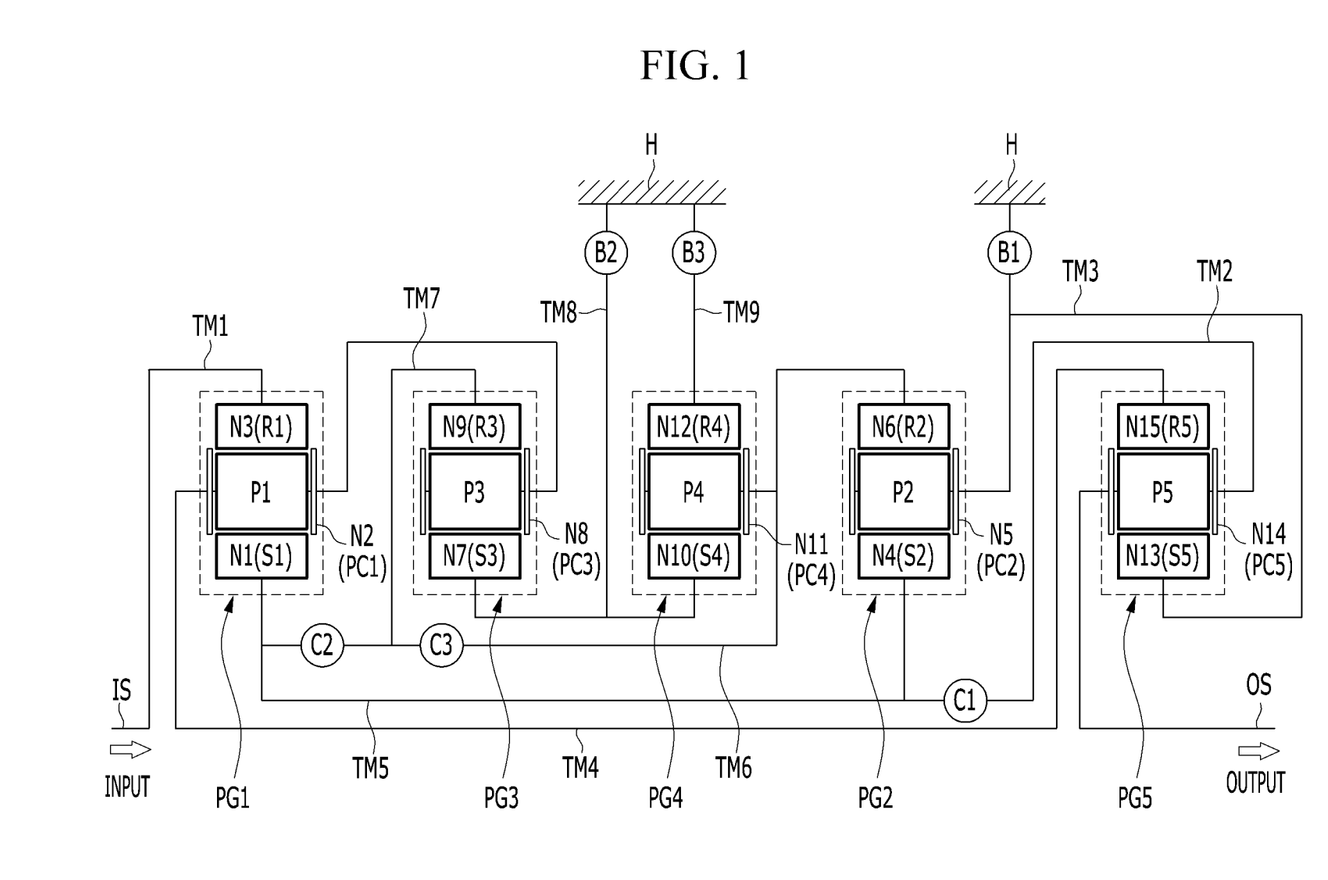
FIG. 1 is a schematic diagram of a planetary gear train in a first exemplary form of the present disclosure.

FIG. 1 is a schematic diagram of a planetary gear train in a first exemplary form of the present disclosure.

Referring to FIG. 1, a planetary gear train includes: first, second, third, fourth, and fifth planetary gear sets PG1, PG2, PG3, PG4, and PG5, arranged on a same axis; an input shaft IS; an output shaft OS; nine shafts TM1 to TM9 interconnecting rotational elements of the first, second, third, fourth, and fifth planetary gear sets (PG1, PG2, PG3, PG4, and PG5) to each other; three clutches C1 to C3 and three brakes B1 to B3 as friction elements; and a transmission housing H.

Torque input from the input shaft IS is shifted by cooperative operation of the first, second, third, fourth, and fifth planetary gear sets PG1, PG2, PG3, PG4, and PG5, and then output through the output shaft OS.

The planetary gear sets are arranged in the order of first, third, fourth, second, and fifth planetary gear sets PG1, PG3, PG4, PG2, and PG5, from an engine side.

The input shaft IS is an input member and the torque from a crankshaft of an engine is input into the input shaft IS, after being torque-converted through a torque converter.

The output shaft OS is an output member, and being arranged on a same axis with the input shaft IS, delivers a shifted driving torque to a drive shaft through a differential apparatus.

The first planetary gear set PG1 is a single pinion planetary gear set, and includes a first planet carrier PC1 that supports first pinion gear P1 externally engaged with the first sun gear S1, and a first ring gear R1 that is internally engaged with the first pinion gear P1. The first sun gear S1 acts as a first rotational element N1, the first planet carrier PC1 acts as a second rotational element N2, and the first ring gear R1 acts as a third rotational element N3.

The second planetary gear set PG2 is a single pinion planetary gear set, and includes a second planet carrier PC2 that supports second pinion gear P2 externally engaged with the second sun gear S2, and a second ring gear R2 that is internally engaged with the second pinion gear P2. The second sun gear S2 acts as a fourth rotational element N4, the second planet carrier PC2 acts as a fifth rotational element N5, and the second ring gear R2 acts as a sixth rotational element N6.

The third planetary gear set PG3 is a single pinion planetary gear set, and includes a third planet carrier PC3 that supports third pinion gear P3 externally engaged with the third sun gear S3, and a third ring gear R3 that is internally engaged with the third pinion gear P3. The third sun gear S3 acts as a seventh rotational element N7, the third planet carrier PC3 acts as an eighth rotational element N8, and the third ring gear R3 acts as a ninth rotational element N9.

The fourth planetary gear set PG4 is a single pinion planetary gear set, and includes a fourth planet carrier PC4 that supports fourth pinion gear P4 externally engaged with the fourth sun gear S4, and a fourth ring gear R4 that is internally engaged with the fourth pinion gear P4. The fourth sun gear S4 acts as a tenth rotational element N10, the fourth planet carrier PC4 acts as a eleventh rotational element N11, and the fourth ring gear R4 acts as a twelfth rotational element N12.

The fifth planetary gear set PG5 is a single pinion planetary gear set, and includes a fifth planet carrier PC5 that supports fifth pinion gear P5 externally engaged with the fifth sun gear S5, and a fifth ring gear R5 that is internally engaged with the fifth pinion gear P5. The fifth sun gear S5 acts as a thirteenth rotational element N13, the fifth planet carrier PC5 acts as a fourteenth rotational element N14, and the fifth ring gear R5 acts as a fifteenth rotational element N15.

In the first, second, third, fourth, and fifth planetary gear sets PG1, PG2, PG3, PG4, and PG5, the first rotational element N1 is directly connected with the fourth rotational element N 4, the second rotational element N2 is directly connected with the eighth rotational element N8 and the fifteenth rotational element N15, the fifth rotational element N5 is directly connected with the thirteenth rotational element N13, the sixth rotational element N6 is directly connected with the eleventh rotational element N11, and the seventh rotational element N7 is directly connected with the tenth rotational element N10, by nine shafts TM1 to TM9.

The nine shafts TM1 to TM9 are hereinafter described in detail.

Each of the nine shafts TM1 to TM9 may be a rotational member that directly interconnects the input and output shafts and rotational elements of the planetary gear sets PG1, PG2, PG3, PG4, and PG5, or may be a fixed member fixed to the transmission housing H.

The first shaft TM1 is connected, and preferably fixedly connected, with the third rotational element N3 (the first ring gear R1), and is directly connected with the input shaft IS, thereby always acting as an input element.

The second shaft TM2 is connected, and preferably fixedly connected, with the fourteenth rotational element N14 (the fifth planet carrier PC5), and is directly connected with the output shaft OS, thereby always acting as an output element.

The third shaft TM3 is connected, and preferably fixedly connected, with the fifth rotational element N5 (the second planet carrier PC2) and the thirteenth rotational element N13 (the fifth sun gear S5).

The fourth shaft TM4 is connected, and preferably fixedly connected, with the second rotational element N2 (the first planet carrier PC1), the eighth rotational element N8 (the third planet carrier PC3), and the fifteenth rotational element N15 (the fifth ring gear R5).

The fifth shaft TM5 is connected, and preferably fixedly connected, with the first rotational element N1 (the first sun gear S1) and the fourth rotational element N4 (the second sun gear S2).

The sixth shaft TM6 is connected, and preferably fixedly connected, with the sixth rotational element N6 (the second ring gear R2) and the eleventh rotational element N11 (the fourth planet carrier PC4).

The seventh shaft TM7 is connected, and preferably fixedly connected, with the ninth rotational element N9 (the third ring gear R3).

The eighth shaft TM8 is connected, and preferably fixedly connected, with the seventh rotational element N7 (the third sun gear S3) and the tenth rotational element N10 (the fourth sun gear S4).

The ninth shaft TM9 is connected, and preferably fixedly connected, with the twelfth rotational element N12 (the fourth ring gear R4).

Here, the third shaft TM3, the eighth shaft TM8, and the ninth shaft TM9 are selectively connected with the transmission housing H, thereby selectively acting as a fixed element.

The nine shafts TM1 to TM9, the input shaft IS, and the output shaft OS may be selectively interconnected with one another by friction elements of three clutches C1, C2, and C3.

The nine shafts TM1 to TM9 may be selectively connected with the transmission housing H, by friction elements of three brakes B1, B2, and B3.

The three clutches C1 to C3 and the three brakes B1 to B3 are arranged as follows.

The first clutch C1 is arranged between the second shaft TM2 and the fifth shaft TM5, and selectively connects the second shaft TM2 and the fifth shaft TM5, thereby controlling power delivery therebetween.

The second clutch C2 is arranged between the fifth shaft TM5 and the seventh shaft TM7, and selectively connects the fifth shaft TM5 and the seventh shaft TM7, thereby controlling power delivery therebetween.

The third clutch C3 is arranged between the sixth shaft TM6 and the seventh shaft TM7, and selectively connects the sixth shaft TM6 and the seventh shaft TM7, thereby controlling power delivery therebetween.

The first brake B1 is arranged between the third shaft TM3 and the transmission housing H, and selectively connects the third shaft TM3 to the transmission housing H.

The second brake B2 is arranged between the eighth shaft TM8 and the transmission housing H, and selectively connects the eighth shaft TM8 to the transmission housing H.

The third brake B3 is arranged between the ninth shaft TM9 and the transmission housing H, and selectively connects the ninth shaft TM9 to the transmission housing H.

The respective friction elements of the first, second, and third clutches C1, C2, and C3 and the first, second, and third brakes B1, B2, and B3 may be realized as multi-plate hydraulic pressure friction devices that are frictionally engaged by hydraulic pressure.

Meanwhile, the friction element is any of a dog clutch, an electric clutch, a magnetic particle clutch, or the like which may be automatically controlled, and may be adopted.

Figure 2:
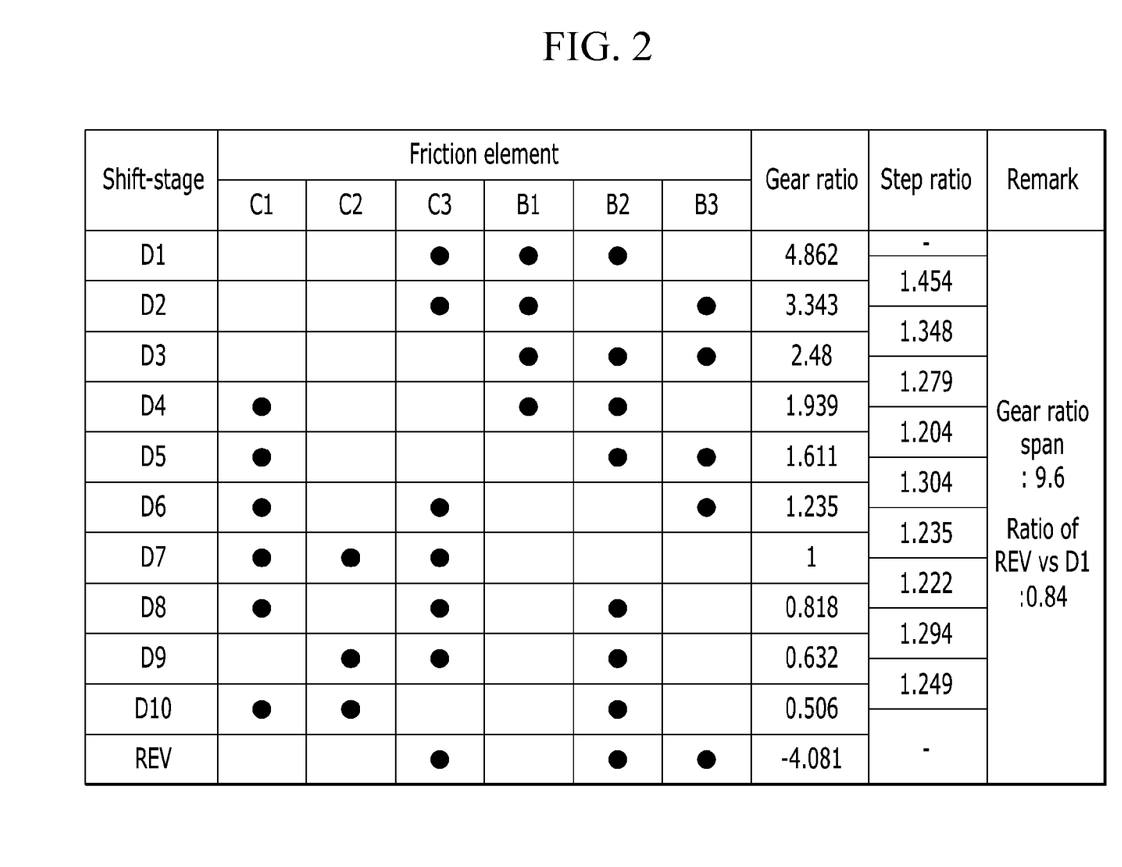
FIG. 2 is an operational chart for respective control elements at respective shift stages in a planetary gear train in a first exemplary form of the present disclosure.

FIG. 2 is an operational chart for respective control elements at respective shift stages in a planetary gear train in a first exemplary form of the present disclosure.

Referring to FIG. 2, a planetary gear train realizes ten forward speeds and one reverse speed by operating three control elements among the first, second, and third clutches C1, C2, and C3 and the first, second, and third brakes B1, B2, and B3 at respective shift-stages.

In the forward first speed shift-stage D1, the third clutch C3 and the first and second brakes B1 and B2 are simultaneously operated.

As a result, the sixth shaft TM6 is connected with the seventh shaft TM7 by operation of the third clutch C3. In this state, the torque of the input shaft IS is input to the first shaft TM1.

In addition, the third and eighth shafts TM3 and TM8 act as fixed elements by the operation of the first and second brakes B1 and B2, thereby realizing the forward first speed by cooperative operation of respective shafts and outputting a shifted torque to the output shaft OS connected with the second shaft TM2.

In the forward second speed shift-stage D2, the third clutch C3 and the first and third brakes B1 and B3 are simultaneously operated.

As a result, the sixth shaft TM6 is connected with the seventh shaft TM7 by operation of the third clutch C3. In this state, the torque of the input shaft IS is input to the first shaft TM1.

In addition, the third and ninth shafts TM3 and TM9 act as fixed elements by the operation of the first and second brakes B1 and B3, thereby realizing the forward second speed by cooperative operation of respective shafts and outputting a shifted torque to the output shaft OS connected with the second shaft TM2.

In the forward third speed shift-stage D3, the first, second, and third brakes B1, B2, and B3 are simultaneously operated.

Accordingly, the torque of the input shaft IS is input to the first shaft TM1.

In addition, the third, eighth, and ninth shafts TM3, TM8, and TM9 act as fixed elements by the operation of the first, second, and third brakes B1, B2, and B3, thereby realizing the forward third speed by cooperative operation of respective shafts and outputting a shifted torque to the output shaft OS connected with the second shaft TM2.

In the forward fourth speed shift-stage D4, the first clutch C1 and the first and second brakes B1 and B2 are simultaneously operated.

As a result, the second shaft TM2 is connected with the fifth shaft TM5 by operation of the first clutch C1. In this state, the torque of the input shaft IS is input to the first shaft TM1.

In addition, the third and eighth shafts TM3 and TM8 act as fixed elements by the operation of the first and second brakes B1 and B2 thereby realizing the forward fourth speed by cooperative operation of respective shafts and outputting a shifted torque to the output shaft OS connected with the second shaft TM2.

In the forward fifth speed shift-stage D5, the first clutch C1 and the second and third brakes B2 and B3 are simultaneously operated.

As a result, the second shaft TM2 is connected with the fifth shaft TM5 by operation of the first clutch C1. In this state, the torque of the input shaft IS is input to the first shaft TM1.

In addition, the eighth and ninth shafts TM8 and TM9 act as fixed elements by the operation of the second and third brakes B2 and B3 thereby realizing the forward fifth speed by cooperative operation of respective shafts and outputting a shifted torque to the output shaft OS connected with the second shaft TM2.

In the forward sixth speed shift-stage D6, the first and third clutches C1 and C3 and the third brake B3 are simultaneously operated.

As a result, the second shaft TM2 is connected with the fifth shaft TM5 by operation of the first clutch C1, and the sixth shaft TM6 is connected with the seventh shaft TM7 by operation of the third clutch C3. In this state, the torque of the input shaft IS is input to the first shaft TM1.

In addition, the ninth shaft TM9 acts as fixed element by the operation of the third brake B3, thereby realizing the forward sixth speed by cooperative operation of respective shafts and outputting a shifted torque to the output shaft OS connected with the second shaft TM2.

In the forward seventh speed shift-stage D7, the first, second and third clutches C1, C2, and C3 are simultaneously operated.

As a result, the second shaft TM2 is connected with the fifth shaft TM5 by operation of the first clutch C1, the fifth shaft TM5 is connected with the seventh shaft TM7 by operation of the second clutch C2, and the sixth shaft TM6 is connected with the seventh shaft TM7 by operation of the third clutch C3. In this state, the torque of the input shaft IS is input to the first shaft TM1.

In this case, entire planetary gear sets PG1, PG2, PG3, PG4, and PG5 integrally rotate, and a torque is outputted as inputted, thereby forming the forward seventh speed and outputting the inputted torque to the output shaft OS connected with the second shaft TM2.

In the forward eighth speed shift-stage D8, the first and third clutches C1 and C3 and the second brake B2 are simultaneously operated.

As a result, the second shaft TM2 is connected with the fifth shaft TM5 by operation of the first clutch C1, and the sixth shaft TM6 is connected with the seventh shaft TM7 by operation of the third clutch C3. In this state, the torque of the input shaft IS is input to the first shaft TM1.

In addition, the eighth shaft TM8 acts as a fixed element by the operation of the second brake B2, thereby realizing the forward eighth speed by cooperative operation of respective shafts and outputting a shifted torque to the output shaft OS connected with the second shaft TM2.

In the forward ninth speed shift-stage D9, the second and third clutches C2 and C3 and the second brake B2 are simultaneously operated.

As a result, the fifth shaft TM5 is connected with the seventh shaft TM7 by operation of the second clutch C2, and the sixth shaft TM6 is connected with the seventh shaft TM7 by operation of the third clutch C3. In this state, the torque of the input shaft IS is input to the first shaft TM1.

In addition, the eighth shaft TM8 acts as a fixed element by the operation of the second brake B2, thereby realizing the forward ninth speed by cooperative operation of respective shafts and outputting a shifted torque to the output shaft OS connected with the second shaft TM2.

In the forward tenth speed shift-stage D10, the first and second clutches C1 and C2 and the second brake B2 are simultaneously operated.

As a result, the second shaft TM2 is connected with the fifth shaft TM5 by operation of the first clutch C1 and the fifth shaft TM5 is connected with the seventh shaft TM7 by operation of the second clutch C2. In this state, the torque of the input shaft IS is input to the first shaft TM1.

In addition, the eighth shaft TM8 acts as a fixed element by the operation of the second brake B2, thereby realizing the forward tenth speed by cooperative operation of respective shafts and outputting a shifted torque to the output shaft OS connected with the second shaft TM2.

In the reverse speed REV, the third clutch C3 and the second and third brakes B2 and B3 are simultaneously operated.

As a result, the sixth shaft TM6 is connected with the seventh shaft TM7 by operation of the third clutch C3. In this state, the torque of the input shaft IS is input to the first shaft TM1.

In addition, the eighth and ninth shafts TM8 and TM9 act as fixed elements by the operation of the second and third brakes B2 and B3 thereby realizing the reverse speed by cooperative operation of respective shafts and outputting a reverse torque to the output shaft OS connected with the second shaft TM2.

Figure 3:
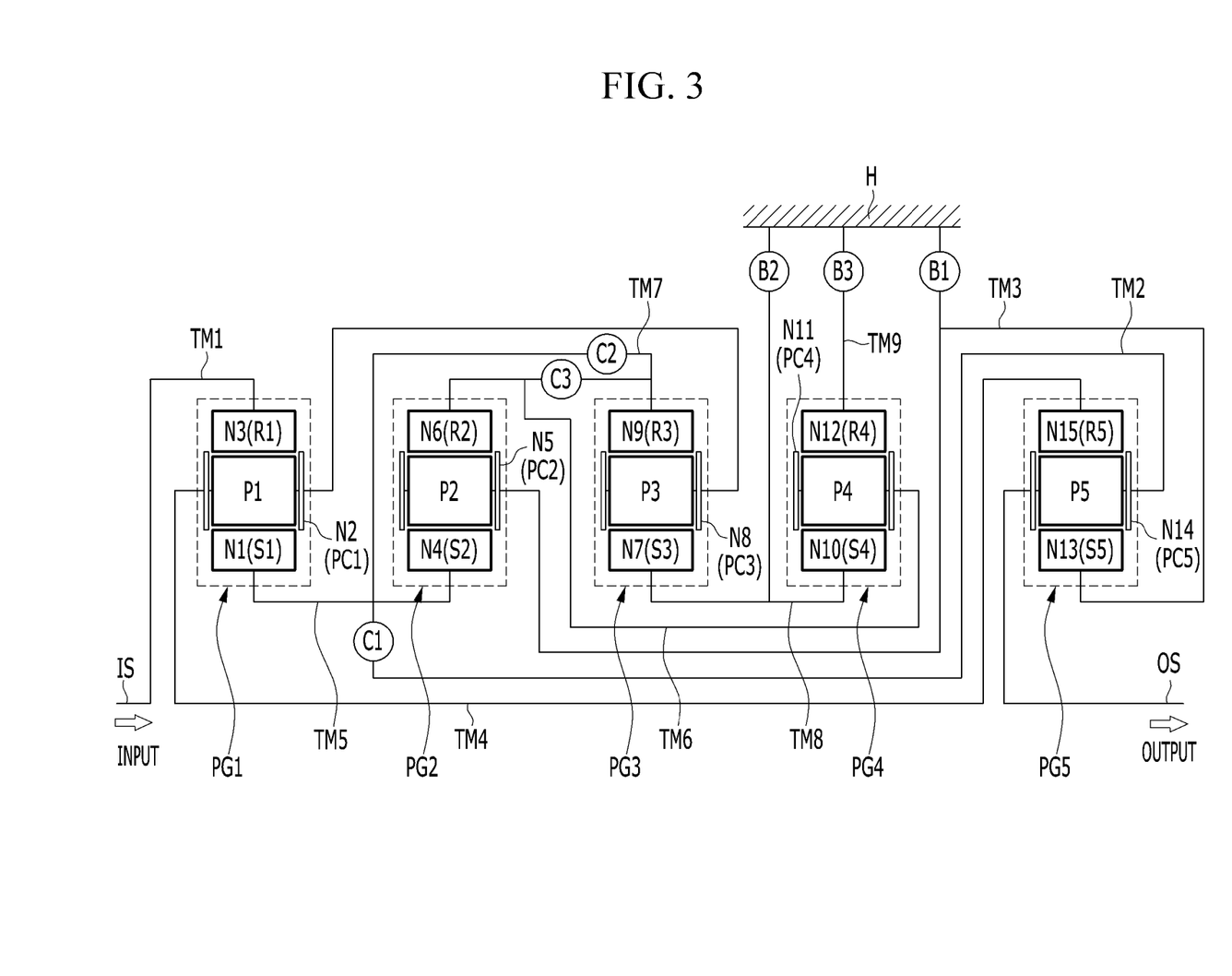
FIG. 3 is a schematic diagram of a planetary gear train in a second exemplary form of the present disclosure.

FIG. 3 is a schematic diagram of a planetary gear train in a second exemplary form of the present disclosure.

Referring to FIG. 1 and FIG. 3, in the planetary gear train according to the first exemplary form of the present disclosure, the planetary gear sets are arranged in the order of first, third, fourth, second, and fifth planetary gear sets PG1, PG3, PG4, PG2, and PG5, from an engine side. However, in the planetary gear train according to a second exemplary form of the present disclosure, there is a difference in that the planetary gear sets are arranged in the order of first, second, third, fourth, and fifth planetary gear sets PG1, PG2, PG3, PG4, and PG5, from an engine side.

As a result, the second exemplary form differs from the planetary gear train according to the first form in the arrangement of the respective planetary gear sets. Therefore, the arrangement of the nine shafts TM1 to TM9, three clutches C1 to C3, and three brakes B1 to B3 are all the same. In addition, the operation and effects of the overall planetary gear train are the same.

As described above, a planetary gear train according to the first and second exemplary forms of the present disclosure may realize at least ten forward speeds and at least one reverse speed by operating five planetary gear sets PG1, PG2, PG3, PG4 and PG5 by controlling the three clutches C1, C2, and C3 and the three brakes B1, B2, and B3.

In addition, a planetary gear train according to an exemplary form of the present disclosure may realize a gear ratio span of more than 9.6, thereby increasing efficiency of driving an engine.

In addition, the linearity of step ratios of shift stages is secured while multi-staging the shift stage with high efficiency, securing linearity of step ratios of shift stages, thereby making it possible to improve drivability such as acceleration before and after a shift, an engine speed rhythmic sense, and the like.

In addition, since the friction elements are reduced, the drag loss of the clutch and brake decreases, thereby improving power transmission efficiency and fuel economy.

In addition, torque transmission efficiency and durability are improved by applying a torque parallel structure to an output side planetary gear set to reduce the torque sharing between each planetary gear set and each friction element.

In addition, a planetary gear train according to an exemplary form of the present disclosure may increase the flexibility of the output gear ratio by applying five planetary gear sets.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

PG1, PG2, PG3, PG4, PG5: first, second, third, fourth, and fifth planetary gear sets
S1, S2, S3, S4, S5: first, second, third, fourth, and fifth sun gears
PC1, PC2, PC3, PC4, PC5: first, second, third, fourth, and fifth planet carrier
R1, R2, R3, R4, R5: first, second, third, fourth, and fifth ring gears
C1, C2, C3: first, second, and third clutches
B1, B2, B3: first, second, and third brakes
IS: input shaft
OS: output shaft
TM1, TM2, TM3, TM4, TM5, TM6, TM7, TM8, TM9: first, second, third, fourth, fifth, sixth, seventh, eighth, and ninth shafts

What is claimed is:

1. A planetary gear train of an automatic transmission for a vehicle, the planetary gear train comprising:
   an input shaft configured to receive an engine torque;
   an output shaft configured to output a changed torque;
   a first planetary gear set including first, second, and third rotation elements;
   a second planetary gear set including fourth, fifth, and sixth rotation elements;
   a third planetary gear set including seventh, eighth, and ninth rotation elements;
   a fourth planetary gear set including tenth, eleventh and twelfth rotation elements;
   a fifth planetary gear set including thirteenth, fourteenth, and fifteenth rotation elements;
   a first shaft connected with the third rotation element and the input shaft;
   a second shaft connected with the fourteenth rotation element and the output shaft;
   a third shaft connected with the fifth rotation element and the thirteenth rotation element;
   a fourth shaft connected with the second rotation element, the eighth rotation element, and the fifteenth rotation element;
   a fifth shaft connected with the first rotation element and the fourth rotation element;
   a sixth shaft connected with the sixth rotation element and the eleventh rotation element;
   a seventh shaft connected with the ninth rotation element;
   an eighth shaft connected with the seventh rotation element and the tenth rotation element; and
   a ninth shaft connected with the twelfth rotation element.

2. The planetary gear train of claim 1, further comprising:
   six friction elements disposed to selectively connect corresponding shafts with each other or selectively connect a corresponding shaft with a transmission housing,
   wherein three friction elements among the six friction elements are operated at forward or reverse speed stages.

3. The planetary gear train of claim 2, wherein the six friction elements comprise:
   three clutches configured to connect two shafts selected from the nine shafts to each other; and
   three brakes configured to selectively connect the corresponding shaft to the transmission housing, wherein the corresponding shaft is not connected to the input shaft or the output shaft.

4. The planetary gear train of claim 2, wherein the six friction elements comprise:
   a first clutch arranged between the second shaft and the fifth shaft;
   a second clutch arranged between the fifth shaft and the seventh shaft;
   a third clutch arranged between the sixth shaft and the seventh shaft;
   a first brake arranged between the third shaft and the transmission housing;
   a second brake arranged between the eighth shaft and the transmission housing; and
   a third brake arranged between the ninth shaft and the transmission housing.

5. The planetary gear train of claim 1, wherein
the first, second, and third rotational elements of the first planetary gear set are respectively a first sun gear, a first planet carrier, and a first ring gear;
the fourth, fifth, and sixth rotational elements of the second planetary gear set are respectively a second sun gear, a second planet carrier, and a second ring gear;
the seventh, eighth, and ninth rotational elements of the third planetary gear set are respectively a third sun gear, a third planet carrier, and a third ring gear;
the tenth, eleventh, and twelfth rotational elements of the fourth planetary gear set are respectively a fourth sun gear, a fourth planet carrier, and a fourth ring gear; and
the thirteenth, fourteenth, fifteenth rotational elements of the fifth planetary gear set are respectively a fifth sun gear, a fifth planet carrier, and a fifth ring gear.

6. The planetary gear train of claim 1, wherein
the first, second, third, fourth, and fifth planetary gear sets are disposed in a sequence of the first, third, fourth, second, and fifth planetary gear sets from an engine side.

7. The planetary gear train of claim 1, wherein
the first, second, third, fourth, and fifth planetary gear sets are disposed in a sequence of the first, second, third, fourth, and fifth planetary gear sets from an engine side.

8. A planetary gear train of an automatic transmission for a vehicle, the planetary gear train comprising:
an input shaft configured to receive an engine torque;
an output shaft configured to output a changed torque;
a first planetary gear set including first, second, and third rotation elements;
a second planetary gear set including fourth, fifth, and sixth rotation elements;
a third planetary gear set including seventh, eighth, and ninth rotation elements;
a fourth planetary gear set including tenth, eleventh and twelfth rotation elements;
a fifth planetary gear set including thirteenth, fourteenth, and fifteenth rotation elements;
a first shaft connected with the third rotation element and the input shaft;
a second shaft connected with the fourteenth rotation element and the output shaft;
a third shaft connected with the fifth rotation element and the thirteenth rotation element;
a fourth shaft connected with the second rotation element, the eighth rotation element, and the fifteenth rotation element;
a fifth shaft connected with the first rotation element and the fourth rotation element;
a sixth shaft connected with the sixth rotation element and the eleventh rotation element;
a seventh shaft connected with the ninth rotation element; and
eighth and ninth shafts selectively connected to a transmission housing, wherein the eighth and ninth shafts are respectively connected to a corresponding rotation element of the third and fourth planetary gear sets that is unconnected to another rotational element selected from the rotational elements of the five planetary gear sets.

9. The planetary gear train of claim 8, wherein
the eighth shaft is connected with the seventh rotation element and the tenth rotation element, and
the ninth shaft connected with the twelfth rotation element.

10. The planetary gear train of claim 9, further comprising:
three clutches configured to connect two shafts among nine shafts to each other; and
three brakes configured to selectively connect the transmission housing to any shaft selected from the nine shafts, wherein the selected shaft is not connected to the input shaft or the output shaft.

11. The planetary gear train of claim 10, wherein the three clutches include:
a first clutch arranged between the second shaft and the fifth shaft;
a second clutch arranged between the fifth shaft and the seventh shaft;
a third clutch arranged between the sixth shaft and the seventh shaft; and
wherein the three brakes include:
a first brake arranged between the third shaft and the transmission housing;
a second brake arranged between the eighth shaft and the transmission housing; and
a third brake arranged between the ninth shaft and the transmission housing.

12. The planetary gear train of claim 8, wherein
the first, second, and third rotational elements of the first planetary gear set are respectively a first sun gear, a first planet carrier, and a first ring gear of the first planetary gear set;
the fourth, fifth, and sixth rotational elements of the second planetary gear set are respectively a second sun gear, a second planet carrier, and a second ring gear of the second planetary gear set;
the seventh, eighth, and ninth rotational elements of the third planetary gear set are respectively a third sun gear, a third planet carrier, and a third ring gear of the third planetary gear set;
the tenth, eleventh, and twelfth rotational elements of the fourth planetary gear set are respectively a fourth sun gear, a fourth planet carrier, and a fourth ring gear of the fourth planetary gear set; and
the thirteenth, fourteenth, fifteenth rotational elements of the fifth planetary gear set are respectively a fifth sun gear, a fifth planet carrier, and a fifth ring gear of the fifth planetary gear set.

13. The planetary gear train of claim 8, wherein
the first, second, third, fourth, and fifth planetary gear sets are disposed in a sequence of the first, third, fourth, second, and fifth planetary gear sets from an engine side.

14. The planetary gear train of claim 8, wherein
the first, second, third, fourth, and fifth planetary gear sets are
disposed in a sequence of the first, second, third, fourth, and fifth planetary gear sets from an engine side.

15. A planetary gear train of an automatic transmission for a vehicle, the planetary gear train comprising:
an input shaft configured to receive an engine torque;
an output shaft configured to output a changed torque;
a first planetary gear set including first, second, and third rotation elements;
a second planetary gear set including fourth, fifth, and sixth rotation elements;
a third planetary gear set including seventh, eighth, and ninth rotation elements;
a fourth planetary gear set including tenth, eleventh and twelfth rotation elements;

a fifth planetary gear set including thirteenth, fourteenth, and fifteenth rotation elements;

a first shaft connected with the third rotation element and the input shaft;

a second shaft connected with the fourteenth rotation element and the output shaft;

a third shaft connected with the fifth rotation element and the thirteenth rotation element;

a fourth shaft connected with the second rotation element, the eighth rotation element, and the fifteenth rotation element;

a fifth shaft connected with the first rotation element and the fourth rotation element;

a sixth shaft connected with the sixth rotation element and the eleventh rotation element;

a seventh shaft connected with the ninth rotation element; and eighth and ninth shafts respectively and selectively connected to a transmission housing, the eighth and ninth shafts are respectively connected to a corresponding rotation element of the third and fourth planetary gear sets that is unconnected to another rotational element selected from the rotational elements of the five planetary gear sets.

16. The planetary gear train of claim 15, further comprising:

first, second, and third clutches configured to respectively and selectively connect the second shaft and the fifth shaft, the fifth shaft and the seventh shaft, and the sixth shaft and the seventh shaft, wherein the third shaft is selectively connected with the transmission housing, the eight shaft is connected with the seventh rotation element and the tenth rotation element, and the ninth shaft is connected with the twelfth rotation element.

17. The planetary gear train of claim 16, wherein the first clutch is arranged between the second shaft and the fifth shaft, the second clutch is arranged between the fifth shaft and the seventh shaft, and the third clutch is arranged between the sixth shaft and the seventh shaft, and wherein the planetary gear train further comprises:

a first brake arranged between the third shaft and the transmission housing;

a second brake arranged between the eighth shaft and the transmission housing; and a third brake arranged between the ninth shaft and the transmission housing.

18. The planetary gear train of claim 15, wherein the first, second, and third rotational elements of the first planetary gear set are respectively a first sun gear, a first planet carrier, and a first ring gear of the first planetary gear set;

the fourth, fifth, and sixth rotational elements of the second planetary gear set are respectively a second sun gear, a second planet carrier, and a second ring gear of the second planetary gear set;

the seventh, eighth, and ninth rotational elements of the third planetary gear set are respectively a third sun gear, a third planet carrier, and a third ring gear of the third planetary gear set;

the tenth, eleventh, and twelfth rotational elements of the fourth planetary gear set are respectively a fourth sun gear, a fourth planet carrier, and a fourth ring gear of the fourth planetary gear set; and the thirteenth, fourteenth, fifteenth rotational elements of the fifth planetary gear set are respectively a fifth sun gear, a fifth planet carrier, and a fifth ring gear of the fifth planetary gear set.

19. The planetary gear train of claim 15, wherein the first, second, third, fourth, and fifth planetary gear sets are disposed in a sequence of the first, third, fourth, second, and fifth planetary gear sets from an engine side.

20. The planetary gear train of claim 15, wherein the first, second, third, fourth, and fifth planetary gear sets are disposed in a sequence of the first, second, third, fourth, and fifth planetary gear sets from an engine side.

* * * * *